United States Patent

Mejia et al.

[11] Patent Number: 5,996,953
[45] Date of Patent: Dec. 7, 1999

[54] MOUNTING ASSEMBLY FOR MOBILE ELECTRONIC EQUIPMENT

[75] Inventors: Alvaro Mejia, Bartlett; Roger K. Fisher, Ivanhoe, both of Ill.

[73] Assignee: Andrew Corporation, Del.

[21] Appl. No.: 09/027,159

[22] Filed: Feb. 20, 1998

[51] Int. Cl.⁶ .................................................. F21L 15/08
[52] U.S. Cl. ................................. 248/216.1; 248/218.3; 248/546
[58] Field of Search .................... 248/216.1, 251, 248/546, 216.4, 217.3, 217.4, 218.1, 218.2, 218.3, 547, 302, 615, 682, 684, 686, 688, 309.2

[56] References Cited

U.S. PATENT DOCUMENTS

| | | | |
|---|---|---|---|
| 1,468,661 | 9/1923 | Friedman | 248/546 |
| 2,104,612 | 1/1938 | Droll | 24/3.3 |
| 2,224,772 | 12/1940 | Ross | 160/349.2 |
| 2,849,201 | 8/1958 | Schelgunov | 248/615 |
| 2,916,839 | 12/1959 | Wheaton | 40/622 |
| 3,127,144 | 3/1964 | Warner | 248/224.7 X |
| 3,219,302 | 11/1965 | Smith | 248/218.3 |
| 3,939,985 | 2/1976 | Hochman | 211/57 |
| 4,567,546 | 1/1986 | Zeller et al. | 361/420 |

Primary Examiner—Ramon O. Ramirez
Assistant Examiner—Anita M. King
Attorney, Agent, or Firm—Vedder Price Kaufman & Kammholz

[57] ABSTRACT

A mounting assembly for mobile electronic equipment modules includes a pair of attachment legs that are adapted to engage the carpet of a vehicle compartment and extend through mounting apertures formed in the equipment module. A pair of retainers serves to retain the module in place on the attachment legs. The attachment legs include carpet engagement portions that extend through the vehicle carpet and remain underneath the carpet base, and support portions that extend up from the attachment legs to provide a support for the equipment module. The support portion extend through apertures formed in the module and receive retainers that secure the module to the attachment leg support portions.

20 Claims, 3 Drawing Sheets

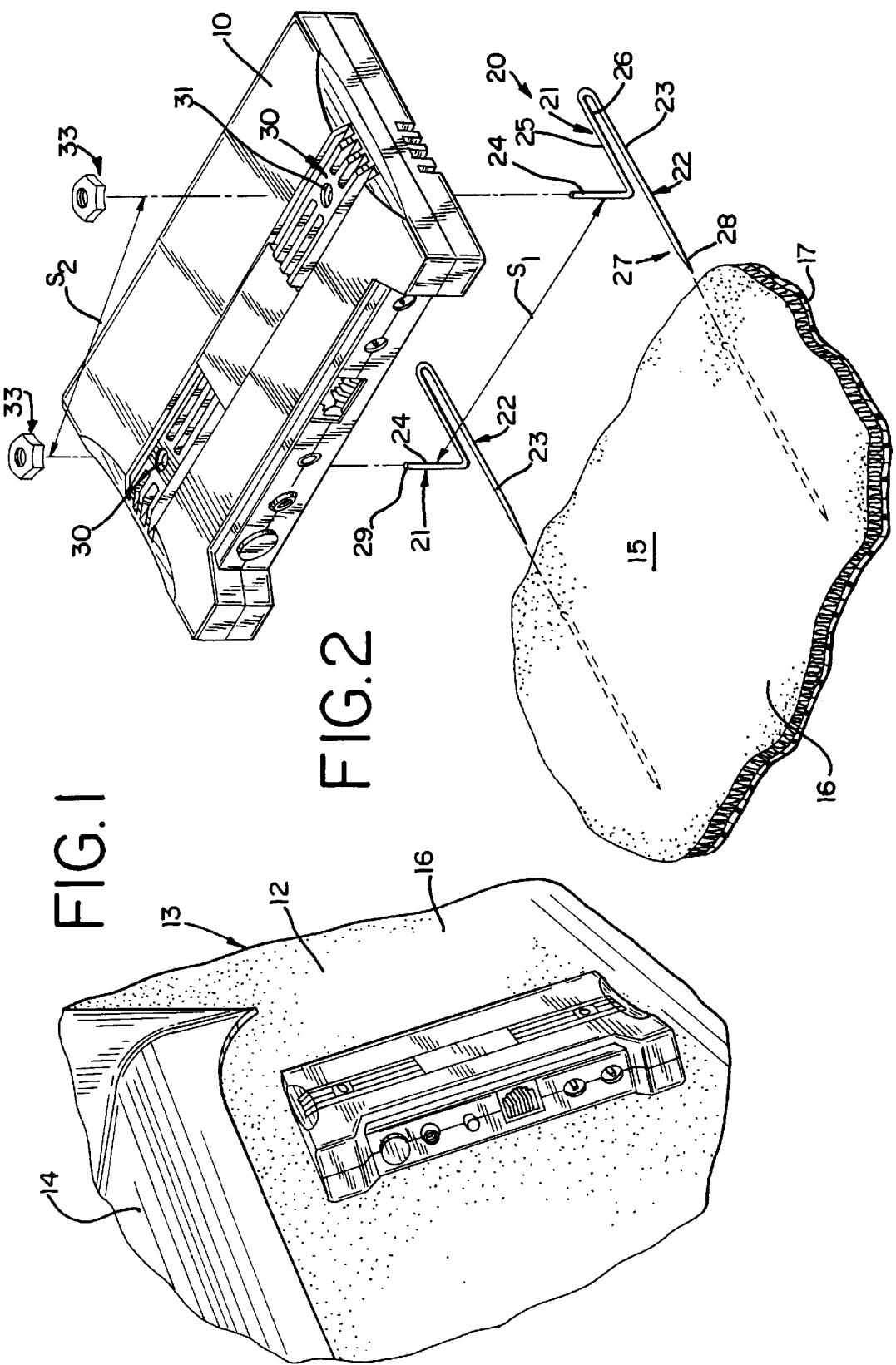

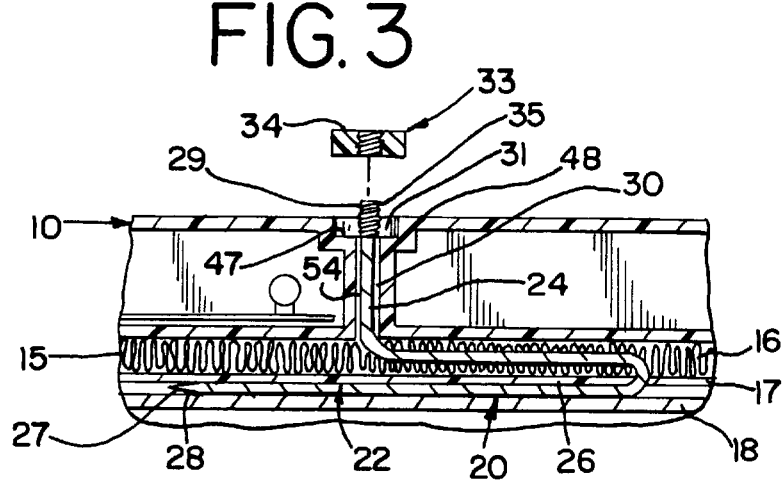
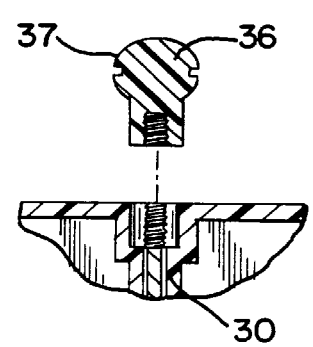
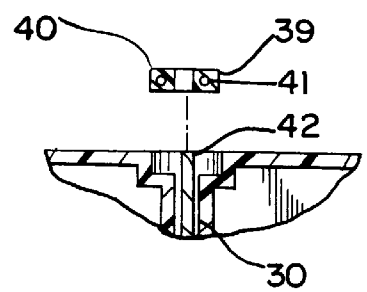
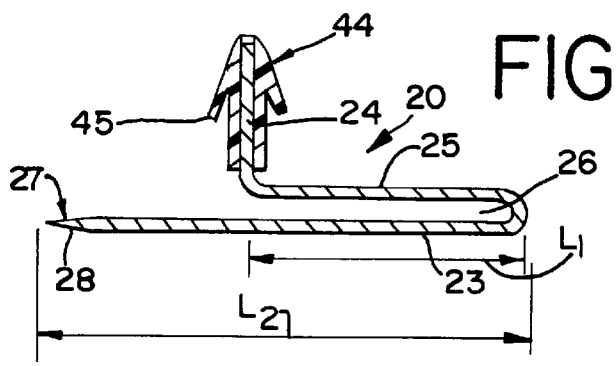
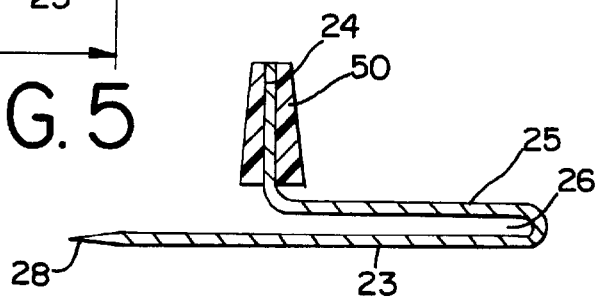

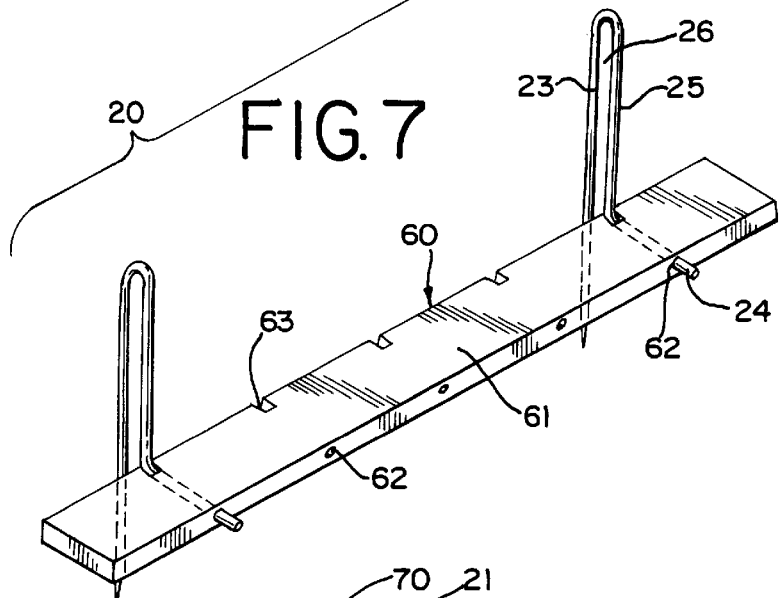
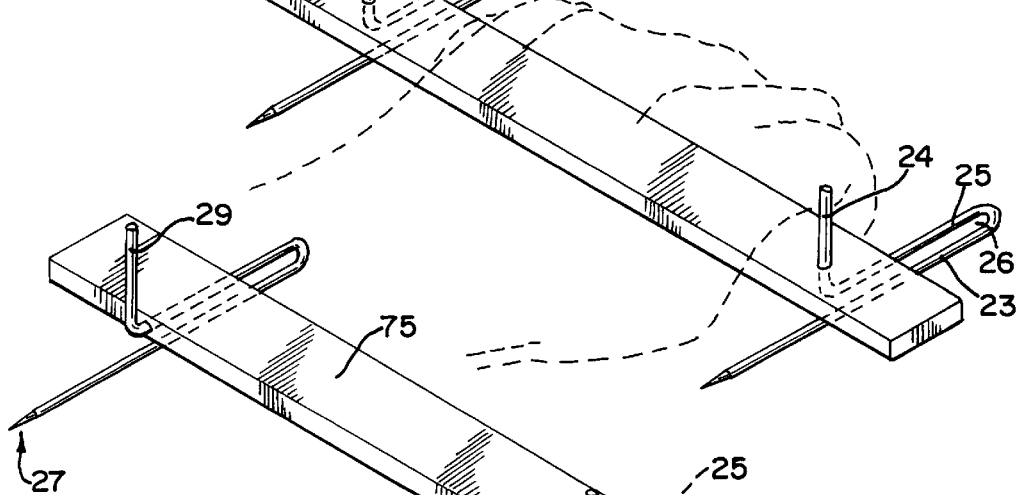
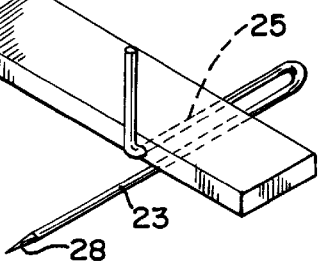

MOUNTING ASSEMBLY FOR MOBILE ELECTRONIC EQUIPMENT

BACKGROUND OF THE INVENTION

The present invention relates generally to mobile electronic equipment and more particularly, to mounting assemblies for mounting such equipment within a vehicle.

Mobile telephones are one form of electronic equipment used in vehicles and are extremely popular and are becoming more widely used by increasing segments of the population. The term "mobile electronic equipment" as used herein may refer to hand-held telephones, telephones mounted in a vehicle, or speakers or other electronic equipment. One type telephone is typically mounted directly in an interior compartment of a vehicle, while the another may be either held by a driver or passenger within the vehicle compartment or may be used in conjunction with a stand in which the hand-held telephone is inserted.

In this instance, as well as the first mentioned instance, certain of the electronic equipment must be mounted to the interior compartment of the vehicle. This mounting typically involves drilling through the floor of the vehicle in order to mount an equipment module or stand on the floor of the vehicle. Although useful for its intended mounting purpose, such drilling permanently affects the condition of the vehicle. Where a driver has leased a vehicle, conditions in his lease may either prevent him from implementing such drilling or it may increase the cost of the lease by characterizing such a mounting as a permanent alteration of the vehicle.

No easily removable mounting assembly for mobile electronic equipment is known in the art that is easy to install, provides a sturdy and reliable mounting for an electronic equipment module and is removable without permanently altering the condition of a vehicle is known. The present invention is therefore directed to a mounting assembly that overcomes the aforementioned disadvantages of the prior art.

SUMMARY OF THE INVENTION

Accordingly, it is a general object of the present invention to provide an improved mounting assembly for mobile electronic equipment that may be installed in a vehicle compartment without great difficulty and may be easily removed without substantially altering the interior compartment of the vehicle.

It is another object of the present invention to provide a mounting assembly for a mobile electronic equipment module that secures the module to a vehicle interior compartment carpet.

It is a further object of the present invention to provide a mounting assembly for mobile electronic equipment having a pair of engagement members adapted to engage the vehicle interior compartment carpet, the engagement members having support posts that are received within apertures formed in the mobile telephone equipment, and retainers to secure the mobile telephone equipment to the support posts, the engagement members being extendible laterally beneath the vehicle carpet, but easily removable upon application of a removal force.

It is yet another object of the present invention to provide an improved mounting assembly for mounting a mobile telephone equipment item to the floor of a vehicle compartment. The mounting assembly including a pair of vehicle carpet engagement members, each of the carpet engagement members having an elongated shaft portion with a sharp end for piercing through the carpet and an elongated support portion that extends at an angle to the shaft portion and through a pair of aligned apertures of the mobile telephone equipment, the mounting assembly including a pair of retainers for retaining the telephone equipment on the support portions.

These objects are accomplished in one principal aspect of the present invention by providing a pair of vehicle carpet engaging members, each having distinct arm and leg portions, the leg portions including sharpened ends for piercing through the carpet of a vehicle. The arm portions of the engagement members are offset with respect to the leg portions to provide support posts that extend upwardly from the carpet surface. A telephone equipment module has apertures that are aligned with the support posts and engageable therewith, while retainers that engage free ends of the support posts retain the equipment module in place on the support posts.

In another principal aspect of the present invention, the retainers may take a variety of forms such as nuts, thumbscrews and the like. The retainers may be formed from a flexible material and attached to the free ends of the support posts so that the free ends of the support posts may be pushed through the equipment module apertures.

In yet another principal aspect of the present invention, a spacer plate is provided to maintain the carpet engaging members at a predesired spacing that matches the spacing of the equipment module apertures. The spacer plate also provides an easily grippable surface to facilitate installation of the carpet hooks by unskilled individuals.

These and other objects, features and advantages of the present invention will be clearly understood through consideration of the following detailed description.

BRIEF DESCRIPTION OF THE DRAWINGS

In the course of the following detailed description reference will be frequently made to the accompanying drawings in which:

FIG. 1 is an enlarged perspective view of a portion of an interior compartment of a vehicle, illustrating a mobile electronic equipment module mounted to the carpeted floor of the vehicle by way of a mounting assembly constructed in accordance with the principles of the present invention;

FIG. 2 is an exploded perspective view of the electronic equipment module of FIG. 1 and the mounting assembly utilized therewith;

FIG. 3 is a detailed cross-sectional view of the electronic equipment module and mounting assembly of FIG. 1, taken in alignment with one of the mounting apertures of the equipment module;

FIG. 3A is a partial detailed sectional view of an alternate retainer which may be utilized with the mounting assembly of the present invention;

FIG. 3B is a partial detailed sectional view of another retainer which may be utilized with the mounting assembly of the present invention;

FIG. 4 is a partial detailed sectional view of an alternate mounting member that may be utilized with the mounting assembly of the present invention;

FIG. 5 is a partial detailed sectional view of another alternate mounting member that may be utilized with the mounting assembly of the present invention;

FIG. 6 is a plan view of a mounting bracket and installation tool used in the mounting assembly of the present invention;

FIG. 7 is a perspective view of the mounting bracket and tool engaged with a pair of mounting brackets in a ready position for installation into a vehicle;

FIG. 8 is a perspective view of an alternate mounting bracket and installation tool engaged with a pair of mounting brackets in a ready position for installation into a vehicle; and, FIG. 9 is a perspective view of still another alternate mounting bracket and installation tool engaged with a pair of mounting brackets in a ready position for installation into a vehicle.

DESCRIPTION OF THE PREFERRED EMBODIMENT

Referring now to FIGS. 1 & 2, an electronic equipment module 10 is illustrated in FIG. 2 as mounted to the carpeted floor 12 of a passenger compartment 13 of a vehicle (not shown). The module 10 may be of the smart box type that contains circuitry for interconnecting to and powering a hand-held telephone. In this regard, such a module 10 typically includes a plurality of jacks into which connectors for various other telephone components may be inserted such as an external speaker and/or microphone, a power module, a telephone and others. Although a box type of module is illustrated in the drawings, it shall be understood that the present insertion is not limited to use with only such modules but may be used with other types of modules and/or telephone equipment, or speakers or the like so long as the module/equipment has one or more apertures formed therein for engaging the mounting assembly 20 of the present invention.

The floor portion 12 shown in FIG. 1, encompasses the right side of a center console 14. The location of the module 10 within the vehicle component is arbitrary. All that is required is a carpeted or other type of piercible floor. FIG. 2 is an exploded view illustrating one embodiment of a mounting assembly 20 constructed in accordance with the principle of the present invention.

The floor 12 of the vehicle, as seen in FIG. 3, includes a carpet layer 15 having an exterior pile face 16 that extends up from a backing layer 17. The carpet layer 15 typically overlies the metal wall 18 that defines the floor and supports the carpet layer 15. The prior art mounting equipment has required drilling through the floor of the vehicle in order to mount a module or equipment to the floor. The present invention avoids this permanent modification to the vehicle floor and relies upon the carpet 15 for a means of support.

The mounting assembly 20 includes two attachment, or engagement, members 21, illustrated in the drawings as hooks 22. The engagement members 21 each preferably include an elongated attachment leg, or base, portion 23 and an elongated support arm, or post, portion 24. The two portions 23, 24 are offset from each other and preferably extend at approximate right angles to each other.

The two portions 23, 24 are interconnected by an elongated intermediate or return portion 25 that is bent upon the attachment portion 23 and separated by an intervening bight portion 26. The intermediate portions preferably have a length $L_1$ that approximates or is slightly greater than the length $L_2$ of the attachment base portions 23 in order to place the support posts 24 in a stable orientation. (FIG. 4.) As seen best in FIG. 3, the engagement members 21 extend through and engage the carpet layer 15. In this regard, the front ends 27 of the attachment bases 23 include sharp points or tines 28 that enable the engagement members 21 to pierce the carpet layer 15. When the engagement members 21 are applied to the carpet layer 15, their attachment bases 23 extend underneath the carpet layer 15 between the same and the underlying metal floor 18. The bight 26 formed between the attachment base 23 and its associated intermediate portion 25 is preferably sized to equal the thickness of the carpet backing 17 in order to provide a reliable engagement with the carpet 15.

The support post 24 extends upwardly as illustrated in FIGS. 2 and 3 in a spacing $S_1$ that matches the spacing $S_2$ of corresponding apertures 30 formed in the equipment module 10. The mounting apertures 30 may include end recesses 31 aligned therewith that at least partially accommodates retainers 33 which engage free ends 29 of their associated support post 24 to secure the equipment module 10 to the floor of the vehicle without permanently altering the floor wall 18.

The retainers 33 may take a variety of configurations. They may include a common threaded nut 34 that engage threaded ends 35 of the support posts 24 as shown in FIG. 3, or they may include larger thumbscrew elements 36 as shown in FIG. 3A that have enlarged head portions 37 to facilitate securement. The retainers 33 may also take the form of lock nut 39 having pliable bodies 40 with an internal locking rings 41 embedded therein that will effectively grip the support post free ends 42 whether they be plain or threaded as illustrated in FIG. 3B. Such type of retainers 33 may be removed to permit the module 10 to be removed or replaced.

Still further, retainers 33 may be formed as part of the engagement members 21. FIG. 4 illustrates such a retainer 44 that is applied to the free end 29 of the support post 24. This retainer 44 may have one or more prongs 45 (either individually formed thereon or formed as a skirt) that extend slightly outwardly. These prongs 45 may be inserted into and through the equipment module apertures 30 and then spring out against an opposing face 47 of the aperture recess 31 or an opposing surface 48 of the module 10 in order to provide their retention function.

Similarly, the retainer 33 may take the form of a wedge-like member 50 applied to the support posts 24 that may be wedged against the inner walls 54 of the module apertures 30.

In order to facilitate installation of the engagement members 21, the mounting assembly 20 may include a spacer member 60 illustrated in FIGS. 6 & 7 as an elongated gripping bar 61. The gripping bar 61 includes a plurality of passages 62 formed therein that extend through the body of the bar and between opposite surfaces thereof. These passages 62 are dimensioned to receive portions of the engagement members 21, illustrated in FIG. 7 as the support posts 24 thereof. The passages 62 include slots 63 communicating therewith at one end that serve to grip the return portions 25 of the engagement members 21 in order to fix their position relative to the bar 61. The passages 62 are spaced apart from each other in a spacing that will match the spacing intervals of mounting apertures 30 of various different telephone equipment modules 10 and other equipment.

FIG. 8 illustrates another embodiment of a spacer member 70 that is oriented perpendicularly with respect to the support posts 24 of the engagement members. This spacer bar 70 and others may also serve to partially support the equipment module 10 on the floor 12 of the vehicle. As shown in phantom in FIG. 8, the presence of the spacer bar 70 facilitates the installation of the engagement members 21 by providing a gripping surface that may be easily grasped by a user's hand.

Lastly FIG. 9 illustrates another embodiment of a space bar 75 that is integrally formed with the engagement members 21, such as by overmolding the bar 75 onto the return portions 25 of the engagement members. In all instances, the module 10 may be removed by removing the engagement members 21 without leaving any discernible trace of alteration to the vehicle.

While the preferred embodiment of the invention have been shown and described, it will be apparent to those skilled in the art that changes and modifications may be made therein without departing from the spirit of the invention, the scope of which is defined by the appended claims. For example, the engagement members may be used individually to mount an item, rather than a pair of engagement members. The engagement members may be used on horizontal sections of carpet as in FIG. 2, or on vertical or angled sections of carpet as in FIG. 1. The modules mounted may even include audio speakers, tape decks, disk players or the like.

What is claimed is:

1. A mounting assembly for mounting an item of electronic equipment within an interior compartment of a vehicle without the need for drilling holes through the floor of the vehicle, the vehicle interior compartment having a layer of carpet overlying said vehicle floor and the equipment item having a pair of mounting apertures formed therein and spaced apart from each other in a predetermined spacing, the mounting assembly comprising:

a pair of engagement members for engaging said carpet and supporting said equipment item thereon, each engagement member having an elongated horizontal base portion and an elongated upright post portion, the base and post portions being interconnected by a return portion, the return portion being aligned with part of said base portion and spaced apart therefrom to define a carpet-receiving bight, said engagement member base portions having carpet-piercing free ends for piercing said carpet layer and inserting a predetermined length of each of said engagement member base portion underneath said carpet layer, whereby part of said carpet layer is received within and reliably engaged by said carpet-receiving bight and said engagement member post portions extend in an upright orientation from said carpet layer so that they may be inserted into said equipment item apertures to thereby support said equipment item on said carpet layer.

2. The mounting assembly as set forth in claim 1, wherein said engagement member post portions include free ends.

3. The mounting assembly as set forth in claim 2, further including a pair of retainers that engage said engagement member post portion free ends in order to retain said equipment item in place on said engagement member post portions.

4. The mounting assembly as set forth in claim 3, wherein said engagement member post portion free ends are threaded and said retainers include threaded members that threadedly engage said engagement post portion free ends.

5. The mounting assembly set forth in claim 4, wherein said retainers include a threaded member chosen from the group consisting essentially of threaded nuts, lock nuts and thumbscrews.

6. The mounting assembly as set forth in claim 3, wherein said retainers include wedge-shaped members disposed on said engagement member post portion free ends.

7. The mounting assembly as set forth in claim 3, wherein said retainers include bayonet retaining members.

8. The mounting assembly as set forth in claim 7, wherein said bayonet retaining members each include a head portion disposed on a corresponding engagement member post portion free end and at least one retention prong extending from said head portion in opposition to a surface of said equipment item.

9. The mounting assembly as set forth in claim 1, wherein said said base portions of said engagement members are longer than said return portion of said engagement members.

10. The mounting assembly as set forth in claim 1, further including a spacer element that engages said engagement members and for maintaining said engagement members in a predetermined spacing that is equal to a spacing separating said equipment item apertures.

11. The mounting assembly as set forth in claim 10, wherein said spacer element extends between said post portions and provides a gripping surface for facilitating piercing of said carpet layer by said engagement members.

12. The mounting assembly as set forth in claim 10, wherein said spacer element extends between said return portions.

13. The mounting assembly as set forth in claim 10, wherein said spacer element is molded to said engagement member.

14. The mounting assembly as set forth in claim 10, wherein said spacer element includes an elongated base having a plurality of passages formed therein that are sized to receive parts of said engagement members therein.

15. A mounting apparatus for mounting an electronic equipment module to a carpeted surface of a vehicle, the vehicle carpeted surface including a base portion and a carpet layer overlying the base portion, the carpet layer having a piled face extending up from a backing layer, the mounting apparatus comprising: a pair of module supports, a spacer bar engaging the module supports and maintaining them in a spaced-apart condition, said module supports including a pair of carpet-piercing elements and a pair of upright posts, the carpet-piercing elements and upright posts being offset with respect to each other, said carpet-piercing elements and said upright posts being interconnected by associated return portions of said module supports that extend along portions of lengths of said carpet-piercing elements so as to locate said upright posts at a predetermined location between opposing ends of said carpet-piercing elements so as to be received within corresponding opposing apertures of said equipment module, said carpet-piercing elements and said upright posts cooperatively defining associated bight portions of said module supports that receive portions of said carpet layer therein when said carpet layer is pierced by said carpet-piercing elements and said carpet-piercing elements are inserted underneath said carpet layer.

16. The mounting apparatus of claim 15, wherein said carpet-piercing elements have associated sharpened free ends.

17. The mounting apparatus of claim 15, further including a pair of retainer elements associated with said module supports, said retainer elements being engageable with free ends of said upright posts to retain said electronic equipment module on said upright posts between said module support return portions and said retainer elements.

18. The mounting apparatus of claim 17 wherein said retainer elements include threaded members of said upright post free ends included threaded ends that are engageable by said threaded members.

19. The mounting apparatus of claim 17, wherein said retainer elements include members that interfittingly engage said equipment module apertures.

20. The mounting apparatus of claim 17, wherein said retainer elements include bayonet style members that engage surfaces of said equipment module.

* * * * *